United States Patent [19]

Wolter et al.

[11] Patent Number: 5,260,011
[45] Date of Patent: Nov. 9, 1993

[54] METHOD OF MAKING REFRACTORY CERAMIC PRODUCTS AND THE PRODUCTS THEREOF

[75] Inventors: Peter A. Wolter; Arthur N. Esposito, both of Elgin, Ill.

[73] Assignee: General Signal Corporation, Stamford, Conn.

[21] Appl. No.: 65,883

[22] Filed: Jun. 24, 1987

Related U.S. Application Data

[63] Continuation-in-part of Ser. No. 878,068, Jun. 24, 1986, Pat. No. 4,935,178.

[51] Int. Cl.⁵ .............................................. C04B 35/10
[52] U.S. Cl. ........................................ 264/56; 264/63; 264/86; 264/87; 264/71; 501/95
[58] Field of Search ................. 264/86, 56, 63, 87, 264/71; 501/95

[56] References Cited

U.S. PATENT DOCUMENTS

| | | | |
|---|---|---|---|
| 1,910,469 | 5/1933 | Kitsee | 264/86 |
| 3,216,841 | 11/1965 | Thellmann | 264/86 |
| 3,835,054 | 9/1974 | Olewinski et al. | 501/95 |
| 4,384,046 | 5/1983 | Nakagami | 501/95 |
| 4,401,613 | 8/1983 | Abell et al. | 264/86 |

OTHER PUBLICATIONS

Baer et al, In Vitro Degradation of a Ceramic-Ceramic Composite, In Ceramic Bulletin, vol. 57, No. 2 (1978).

*Primary Examiner*—James Derrington
*Attorney, Agent, or Firm*—Marshall A. Burmeister; Raymond E. Smiley

[57] ABSTRACT

The method of making refractory ceramic products in which a slurry is formed of water, powdered alumina, and amorphous fibers containing $AL_2O_3$ and $SiO_2$, the volume of water in the slurry being sufficient to permit the slurry to flow under vibration but insufficient to permit the slurry to flow without vibration, the fibers having a molecular ratio of $Al_2O_3$ to $SiO_2$ substantially less than 3 to 2 and the molecular ratio of $Al_2O_3$ to $SiO_2$ in the combined slurry being at least 3 to 2, thereater placing the slurry in a liquid absorbing mold and vibrating the slurry to fill the mold, then permitting the mold to absorb a portion of the water from the slurry to form a body, then removing the body from the mold and drying the body, and thereafter heating the body to combine silica and alumina from the fibers and powdered alumina to recrystalize the fibers in the from of mullite.

7 Claims, 2 Drawing Sheets

METHOD OF MAKING REFRACTORY CERAMIC PRODUCTS AND THE PRODUCTS THEREOF

This application is a continuation-in-part of the inventors' copending U.S. patent application Ser. No. 06/878,068 filed Jun. 24, 1986, now U.S. Pat. No. 4,935,178 entitled REFRACTORY FIBER PRODUCTS AND METHOD OF MAKING SUCH PRODUCTS. The present invention relates to methods of producing refractory products containing ceramic fibers and the products produced by such methods. In particular, the present invention relates to methods of producing refractory products containing alumina-silica ceramic fibers and such refractory products.

BACKGROUND OF THE INVENTION

The principal object of the present invention is to provide a fiber ceramic product which can be utilized at high temperatures and is less costly to manufacture than other fiber ceramic products capable of use at such temperatures.

It is a further object of the invention to provide a fiber ceramic product manufactured with low cost alumina-silica ceramic fibers which has the dimensional stability of ceramic fiber products manufactured with high alumina content alumina-silica fibers, and it is a particular object of the present invention to provide refractory shapes and insulating blocks manufactured in this manner.

Refractory insulating blocks containing ceramic fibers are in commercial use in both electric furnaces and other types of furnaces U.S. Pat. No. 3,500,444 of Mar. 10, 1970, issued to W. K. Hesse et al entitled ELECTRICAL HEATING UNIT WITH AN INSULATING REFRACTORY SUPPORT is an example of such a block supporting an electrical heating element. The fibers are more fully described in an article entitled "Critical Evaluation of the Inorganic Fibers" in Product Engineering, Aug. 3, 1964, pages 96 through 100. The fibers used in refractory insulating blocks at the present time are generally of $Al_2O_3$-$SiO_2$ compositions.

Hesse discloses a process for manufacturing thermal insulating blocks of inorganic fibers in which the fibers are mixed with a body of water to form a random distribution and the water is removed by vacuum through a filter plate. Another example of a refractory thermal insulating fiber block formed by a vacuum process is that disclosed in the U.S. Pat. No. 4,575,619 of Ludwig Porzky entitled ELECTRICAL HEATING UNIT WITH SERPENTINE HEATING ELEMENT. Fiber blocks produced by suspending inorganic ceramic fibers in a body of water to form a slurry have also been more recently produced by use of vibration to facilitate removal of the liquid component of the slurry as disclosed by U.S. patent application Ser. No. 06/868,651 of Duane L. Sterwald filed May 30, 1986 entitled METHOD OF MAKING THERMAL INSULATING BLOCKS AND ELECTRICAL HEATING UNITS AND THE PRODUCTS THEREOF, now U.S. Pat. No. 4,719,336 issued Jan. 12, 1988.

The present inventors have also discovered that ceramic products may be produced from inorganic fibers by mixing the fibers with a relatively smaller quantity of water, thereafter placing the fibers in a mold, and thereafter absorbing moisture from the mixture in the mold to produce a hardened molded body, as disclosed in their U.S. patent application Ser. No. 06/878,068, filed Jun. 24, 1986, now U.S. Pat. No. 4,935,178 entitled REFRACTORY FIBER PRODUCTS AND METHOD OF MAKING SUCH PRODUCTS.

Alumina-silica fibers have also been added to ceramic composites to improve the mechanical properties of porous ceramics, as described by D. A. Sheldon and David Lewis in an article entitled "Fabrication and Properties of a Ceramic Fiber-Ceramic Matrix Composite", Journal of the American Ceramic Society, August 1976, pages 372-374, and by John R. Baer and David Lewis III in an article entitled "In Vitro Degredation of Ceramic-Ceramic Composite" in Ceramic Bulletin, Vol 57, No. 2 (1978), pages 220-222. The described products are not for high temperature use, and have higher densities than desired for refractory thermal blocks.

R. Ganz and W. Kronert, in an article entitled "Crystallisation Behaviour of High Temperature Ceramic Fibers of the $Al_2O_2$-$SiO_2$ System", Ceramic Bulletin, Vol. 57 No. 2 (1978), have described the behavior of alumina-silica fibers with increases in temperature up to and including the temperatures experienced by refractory materials. The article concludes that the fibers are substantially amorphous and recrystallize with increased temperature. Experiments with fibers containing about 46% $Al_2O_3$ and 53% $SiO_2$ indicate that up to approximately 1300° C., the recrystallization is in the form of mullite which is relatively stable and forms at the areas of contact of the fibers. Above about 1300° C. recrystallization occurs in the form of cristobalite. The formation of mullite is not accompanied by a marked change in the ratio of the diameter to the length of the fibers, but recrystallization in the form of cristobalite is accompanied by such a change, thus resulting in embrittlement and deterioration of the fiber structure. The Ganz and Kronert article also classifies fibers for service at 1260° C., 1400° C. and 1600° C., those fibers intended for higher temperature use containing a larger ratio of $Al_2O_3$ molecules to $SiO_2$ molecules. Fibers containing a larger ratio of alumina to silica are shown to be more stable dimensionally than fibers containing a lower ratio of alumina to silica.

Silica-alumina fibers for use at higher temperature, such as 1600° C. fibers, must contain a higher percentage of alumina than fibers classified for lower temperature use and are more costly to produce. The Ganz and Kronert article describes methods for producing such fibers with alumina contents up to approximately 65% and states that higher alumina contents cannot be obtained because of the decreased viscosity of the melted ceramic materials. Alumina-silica fibers with greater than 66% alumina are now commercially available at a premium price including fibers with alumina contents as high as 95%.

SUMMARY OF INVENTION

It is an object of the present invention to provide a method for producing refractory ceramic material from relatively inexpensive alumina-silica ceramic fibers which can be operated at higher service temperatures than such fibers could be used heretofore and even at service temperatures approaching the service temperatures of the most expensive alumina-silica fibers. More specifically, the present inventors have provided a method for producing refractory ceramic products utilizing fibers containing at least 90% $Al_2O_3$ and $SiO_2$ in the ratio of approximately 40% to 65% $Al_2O_3$ molecules to 60% to 35% $SiO_2$ molecules. The products are capable of withstanding service temperatures as high as 1600° C. It is also an object of the present invention to provide low cost ceramic products, such as thermal insulating blocks, produced by such methods.

Recrystallization of alumina-silica fibers to mullite is known to require three atoms of $Al_2O_3$ for every two atoms of $SiO_2$, the composition of mullite being known to be $3Al_2O_3$-$2SiO_2$. The transfer of alumina atoms from the alumina-silica fibers caused by the recrystallization of mullite leaves the fibers rich in silica. The Ganz and Kronert article theorizes that "Cristobalite does not appear before the residual glass becomes so rich in silica because of mullite precipitation that supersaturation with respect to cristobalite occurs." Regardless of theory, the present inventors have found that amorphous alumina-silica fibers, containing less than 67% $Al_2O_3$ atoms may be utilized in combination with granular alumina to produce a ceramic product which will recrystallize at elevated temperatures predominantly in the form of mullite, and that such a product can be operated at service temperatures suitable for mullite fibers. Granular alumina is a relatively inexpensive raw material, and may be combined with the most inexpensive of alumina-silica fibers to produce a refractory ceramic product capable of service temperatures up to approximately 1600° C.

The inventors' copending U.S. patent application Ser. No. 06/878,068 filed Jun. 24, 1986 now U.S. Pat. No. 4,935,178 entitled REFRACTORY FIBER PRODUCTS AND METHOD OF MAKING SUCH PRODUCTS discloses a process for producing a refractory fiber ceramic product from fibers obtained from the Carborundum Company under the trademark FIBERFRAX which contain 47% $Al_2O$ and 53% $SiO_2$ by means of a thixotropic casting method. The present invention may also be carried out by other casting methods as will be described hereinafter.

DESCRIPTION OF THE DRAWINGS

The present invention will be more fully understood with reference to the drawings, in which.

DETAILED DESCRIPTION OF INVENTION

The patent application of Duane L. Sterwald, U.S. Pat. Ser. No. 06/868,651, referred to above, points out the desirability of adequate strength in a molded fiber insulating block. The strength of a molded fiber insulating block is stated by Sterwald to require an adequate density for the block and a random orientation of the fibers within the block. The process disclosed in the Sterwald application mixes a mass of fibers in a relatively large body of water and a binder to form a slurry, and thereafter separates a large portion of the liquid component of the slurry from the solid component of the slurry through a filter plate. This process results in the fibers being randomly oriented with a plurality of contact areas between each fiber and adjacent fibers, and in the Sterwald process, a portion of the liquid component of the slurry adheres to the fibers at the contact areas to permit the binder on heating to sinter and retain the fibers in a fixed lattice.

While the Sterwald process attains random orientation of the fibers, the presence of binder at the areas of contact between the fibers reduces the likelihood of an alumina particle being in contact with the alumina-silica fibers at the contact areas. Further, the fact that the liquid component of the slurry in the Sterwald process is filtered through a relatively porous filter plate, is a hindrance to maintaining alumina particles in the filter mat, and hence the process of Sterwald cannot readily be utilized in the process of the present invention.

Figure 1:
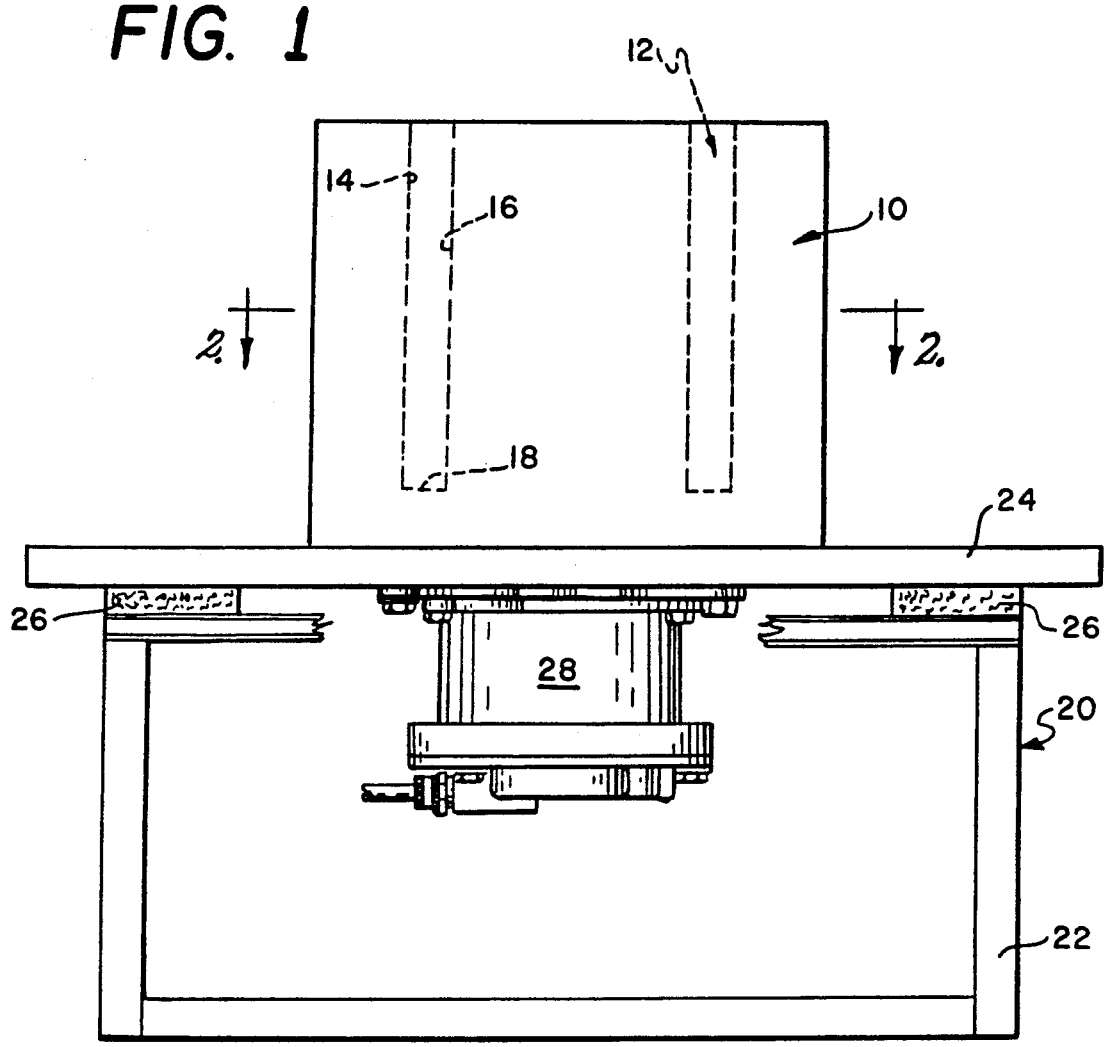
FIG. 1 is a front elevational view of one embodiment of molding equipment utilized in carrying out the processes of the present invention and in making the products of the present invention.
Figure 2:
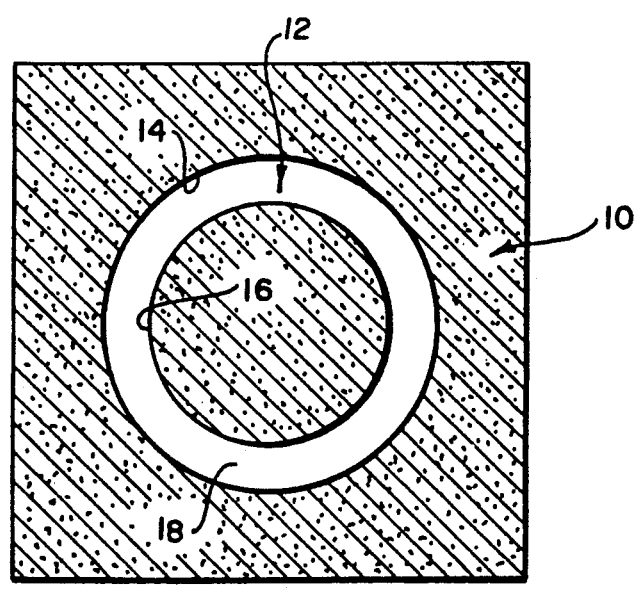
FIG. 2 is a sectional view of the mold taken along the line 2—2 of FIG. 1.

On the other hand, the thixotropic process disclosed in the inventors' copending U.S. Pat. Ser. No. 06/878,068 filed Jun. 24, 1986, now U.S. Pat. No. 4,935,178, entitled REFRACTORY FIBER PRODUCTS AND METHOD OF MAKING SUCH PRODUCTS and illustrated in FIGS. 1 and 2 is entirely suitable for practicing the present invention. FIG. 1 illustrates a mold 10 for thixotropic casting. Such molds are constructed of water absorbent materials, such as plaster of Paris, and the mixture of ceramic material and water placed in such a mold contains sufficiently small quantities of water that the absorption of the water from the mixture in the walls of the mold permits the ceramic material in the mold to harden.

The mold 10 contains a recess 12 shaped to form the desired product, and in the illustration of FIGS. 1 and 2, the recess 12 is shaped to form a cylindrical tube. The recess 12 has a cylindrical outer wall 14 and a cylindrical inner wall 16. In addition, the recess has a circular bottom wall 18.

The mold 10 rests upon a vibration table 20 which is provided with a frame 22 supporting a table top 24 through a plurality of compliant spacers 26 disposed at intervals about the perimeter of the table 24. A vibrator 28 is mounted on the underside of the table top 24, and operation of the vibrator 28 causes the table top 24 to vibrate with respect to the frame 22.

To cast a product with ceramic fibers, a mixture of alumina-silica ceramic fibers, granular alumina and water is prepared. In order to produce a physically strong ceramic body, it is necessary for the fibers and granular alumina to be randomly distributed throughout the body and accordingly, the fibers and alumina must be randomly distributed in the mixture. If the fibers are too long, they will tend to ball, or otherwise become aligned, and accordingly, the fibers must be relatively short. Further, if fibers are relatively long, the fibers will pack less densely in the mold. The inventors have found that the length of the ceramic fibers should not exceed ¼ inch on average with this process.

In accordance with the present invention, alumina-silica fibers containing 40 to 65% $Al_2O_3$ and approximately 60 to 35% $SiO_2$ are utilized. Granular or powdered alumina is mixed with a mass of the fibers, and the solid materials are admixed with a body of water to form a slurry. The alumina refractory powder must contain in excess of 50% $Al_2O_3$ and preferably 95% $Al_2O_3$ or higher. T-64 tabular alumina from Alcoa Chemical Division contains approximately 99% $Al_2O_3$ and is available in a fine powder (−325 mesh).

The alumina-silica fibers and powdered alumina are mixed with water using a low intensity mixer to produce a uniform distribution of fibers and alumina powder within the mixture. There must be sufficient water present to fill all of the voids between the fibers, but as little water as possible should be used in the mixture, since the water must be absorbed in the mold in order to permit the ceramic product to harden. The amount of water necessary in the mixture should be just sufficient to permit the mixture to flow under vibration, but not flow in the absence of vibration, as in conventional thixotropic casting processes.

It is desirable to provide a dispersing agent in the slurry to make certain that contact is made between the water and all portions of the ceramic fiber and powdered alumina. Dispersing agents are available commercially, and Darvan No. 7 distributed by R. T. Vanderbilt Company, Inc. has proven to be satisfactory. The liquid component of the slurry is normally water and dispersant but can be any liquid that provides a uniform distribution of fibers and alumina powder within the mixture, and can be removed from the mixture to permit the ceramic product to harden such as alcohol.

The mold must contain sufficient mass to absorb the water from the slurry inserted in the recess of the mold. One suitable material for the mold is plaster of Paris which is a dehydrated gypsum. The water content of the mixture is approximately equal to that of the alumina-silica fibers and powdered alumina by weight.

It is desirable to retard the flow of moisture from the mixture in the recess of the mold in order to obtain a more uniform distribution of the mixture in the mold and the moisture in the product. For this purpose, a water absorbing retardant is mixed with the mixture of fibers, powdered alumina and water. Alginates have proven to be satisfactory for this purpose. Sodium alginate and ammonium alginate have proven to be particularly suitable and have the effect of providing a skin on the wall of the plaster mold to produce a smooth product. Sodium or ammonium alginate is mixed with the water, fibers, and powdered alumina prior to placing the mixture in the mold. The alginates may be omitted from the mixture, and the mold coated with polyvinyl alcohol as an alternative.

The process for producing a sintered ceramic product according to the present invention starts with the preparation of the liquid component of the slurry, namely, admixing water, the water absorbing retardant in a range of 0.5 to 4 grams per thousand cubic centimeters of water, and the dispersing agent in the range of 0.5 to 4 cubic centimeters per hundred cubic centimeters of water. Thereafter, a mass of alumina-silica fibers of proper length and uniformity is placed in a mixing bowl with a mass of powdered alumina, and a quantity of the liquid component is added to the fibers and powdered alumina, and the slurry thus formed is mixed in the mixing bowl. Additional liquid component is added until the mixture of fibers, powdered alumina, and liquid component has a pudding consistency, that is, a consistency which will not flow except under mechanical agitation.

Thereafter, the mixture of fibers, powdered alumina and liquid component is transferred by hand into the recess of the mold and the vibrator is placed in operation to make the mixture of liquid component, powdered alumina and fibers sufficiently flowable to obtain good contact with the walls of the recess in the mold. When the recess is filled, and all air pockets have been removed, and good contact is achieved with the walls of the mold, the vibrator is turned off. The mixture in the recess of the mold is then allowed to harden. After a period of time, the mixture will become sufficiently hard that the actuation of the vibrator will not cause the mixture to become fluid. At this time, the product has sufficient green strength to be removed from the mold and permitted to air dry. The product may also be dried in a low temperature oven if desired.

Thereafter, the green product is placed in an oven and the temperature raised to the range of 950° C. to 1500° C., thereby causing the combination of $SiO_2$ units with $Al_2O_3$ units in the ratio of two to three to produce mullite. Mullite crystals appearing at the contact areas between adjacent fibers bind the fibers together in a rigid structure. A product produced by the alumina-silica fibers and powdered alumina will remain dimensionally stable at temperatures up to approximately 1600° C. At temperatures below this temperature, the ceramic fiber product formed by this process will remain dimensionally stable for long periods of service without embrittlement or deterioration.

An example of the process of making a refractory fiber ceramic product which includes powdered alumina and the resulting product is as follows.

EXAMPLE 1

The liquid component of the mixture was first prepared by admixing 2 grams of ammonium alginate per 1000 cubic centimeters of water, and a dispersing agent in the form of Darvan No. 7 in the amount of 2 cubic centimeters of dispersing agent per 100 cubic centimeters of water. Fibers obtained from the Carborundum Company under the trademark FIBERFRAX were chopped to an average length of approximately ⅛ inch and processed so that the shot content was less than 25% by weight. The chemical analysis of the FIBERFRAX alumina-silica fibers is 47% $Al_2O_3$, 53% $SiO_2$. The processed fibers were admixed with a refractory powder in the form of Alcoa Chemicals Division's T-64 tabular alumina (−325 mesh) in equal proportions by weight. 400 grams of the dry mixture of tabular alumina and processed fibers was then placed in a mixing bowl and the liquid component was added to the dry component and admixed in the mixing bowl to produce a pudding consistency. The mixture was then hand fed into a plaster mold and the mold was subjected to vibration until the mold was full and air pockets were removed from the mold. The vibration was stopped and the mold was allowed to absorb enough water from the mixture so that further vibration would not cause the mixture to become fluid.

Thereafter, the product was stripped from the mold and the product was permitted to air dry for a period of 24 hours. The air dried product was then placed in a furnace at a temperature of 1500° C. for a period of 6 hours to produce a quantity of mullite in the product. The end product had a density of 70 lbs. per cubic foot.

The vibrator operated at a frequency of 60 cycles per second. The process is not sensitive to the frequency of vibration of the vibration table, and the agitation is only necessary to assure contact of the mixture with the walls of the mold. Also, the mixer utilized in the process is not critical. Mixers manufactured by Hobart Manufacturing Company for kitchen use, such as the Kitchenaid Model K-45 or Hobart Model A-200 have proven to be satisfactory.

The thixotropic casting method illustrated in FIGS. 1 and 2 is particularly suitable for use in the present invention since it tends to trap the powdered alumina particles in the mold with the alumina-silica fibers. However, the present invention may also be practiced with other types of apparatus, such as the press mold shown in FIGS. 3 and 4.

Figure 3:
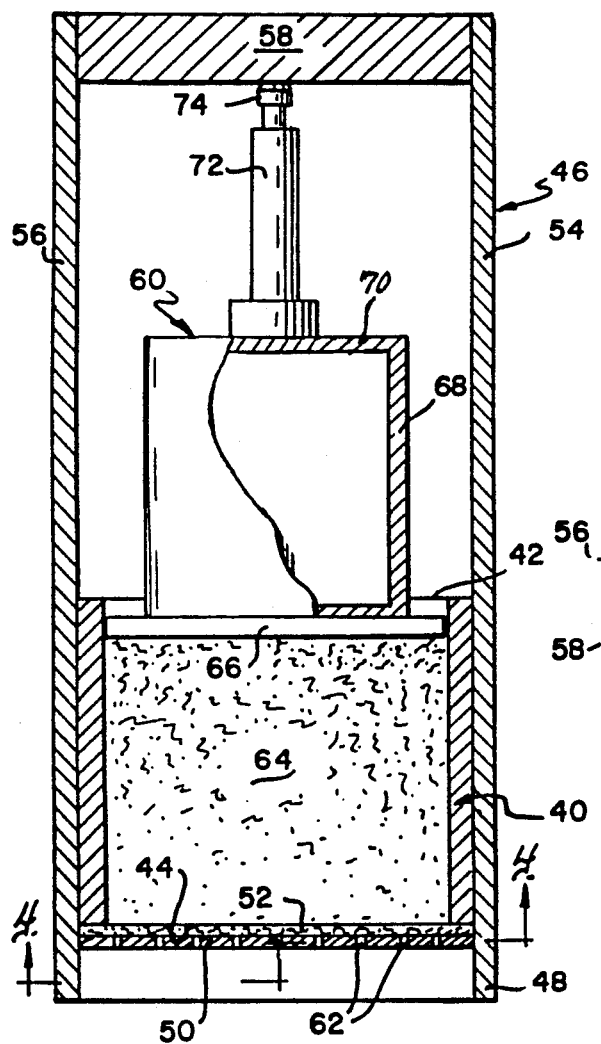
FIG. 3 is a vertical sectional view of a second embodiment of molding equipment utilized to carry out the processes of the present invention.
Figure 4:
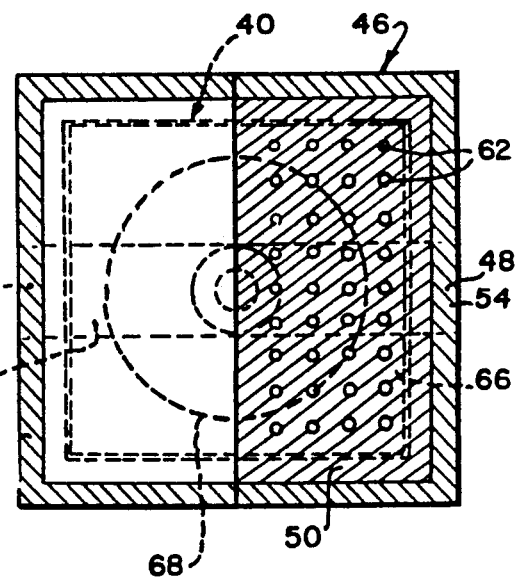
FIG. 4 is a sectional view taken along the line 4—4 of FIG. 3.

In FIGS. 3 and 4, a rectangular mold 40 is illustrated with an open upper end 42 and open lower end 44. The mold 40 is disposed within a rectangular frame 46 which extends from the upper end 42 of the mold 40 to an open rectangular base 48 below the lower end 44 of the mold. The base 48 is adapted to rest upon a supporting structure, and supports a perforated filter plate 50 and a felt pad 52 disposed between the plate 50 and the mold 40. The pad 52 extends across the lower end of the mold 40 and rests against the filter plate 50.

The frame 46 has a pair of risers 54 and 56 which extend upwardly from the rectangular lower portion of the frame 46 to support a crossbeam 58. The crossbeam 58 forms a supporting structure for a hydraulic jack and plunger assembly 60 to be described hereinafter.

The perforated plate 50 is provided with a plurality of apertures 62 which confront the felt pad 52 in the region confronting the open lower end 44 of the mold 40. A slurry comprising substantially amorphous alumina-silica fibers, powdered alumina and water is placed within the mold filling the region of the mold from the felt pad 52 up to a level adjacent to the upper end 42 of the mold. The felt pad 52, while porous, is sufficiently closely woven to retain water in the mold in the absence of pressure on the slurry 64. Accordingly, the liquid component of the slurry 64 remains trapped between the walls of the mold 40 and the felt pad 52. In order to cause the water to pass through the felt pad 52 and the apertures 62 of the plate 50, it is necessary to pressurize the slurry 64 by actuating the hydraulic jack and plunger assembly 60.

The hydraulic jack and plunger assembly 60 is removable from the frame 46 and mold 40 during the filling process of the mold. Once the slurry 64 is positioned within the mold 40, the hydraulic jack and plunger assembly is repositioned within the frame 46.

The hydraulic jack and plunger assembly 60 has a rectangular plunger 66 which is slidably accommodated within the walls of the mold 40 and is adapted to place pressure upon the slurry 64 when urged downwardly in the mold 40. The plunger 66 is mounted on a cylindrical jackstand 68 which has an upper wall 70 which supports a hydraulic jack 72. The hydraulic jack 72 has a stem 74 which extends therefrom into abutment with the crossbar 58 of the frame 46. By exerting force on the crossbar 58, the hydraulic jack 72 forces the plunger 66 downwardly on the slurry 64, thereby causing the slurry 64 to pressurize and force the liquid component to migrate downwardly through the felt pad 52 and perforated plate 50 to reduce the water content of the slurry.

One of the advantages of the process of FIGS. 3 and 4 is that ceramic fiber products may be formed with lower density than can be achieved with the thixotropic casting method of FIGS. 1 and 2 and higher densities than can be achieved with vacuum forming of the filter mat. In addition, very little of the granulated alumina will escape from the mold in the embodiment of FIGS. 3 and 4, thus providing adequate $Al_2O_3$ molecules to permit the crystallization of mullite. Further, commercially available alumina-silica fibers may be utilized with this process without chopping. Fibers having diameters of 2-3 microns (mean) and lengths of 14 microns (mean) are suitable.

The following is an example of a thermal insulating block produced by the press mold method of FIGS. 3 and 4.

EXAMPLE 2

Three pounds of substantially amorphous fiber containing 47% $Al_2O_3$ and 53% $SiO_2$ by weight obtained from the Carborundum Company under the name Fiberfrax was mixed with 3.76 pounds of Type T-64 tabular alumina obtained from Alcoa Corporation ground to a −325 mesh and containing low iron. The liquid component of the slurry was formed by 100 cc. of Darvan No. 7 dispersant from R. T. Vanderbilt Company and 90 pounds of water. The liquid component and solid components were admixed with a high speed propeller type mixer—namely a Jiffey 7 blade—mounted on a 1000 rpm drill press. The liquid component and solid component were mixed for 1 hour in a 20 gallon container to form a well dispersed slurry.

The mixed slurry was then removed from the container and placed in the mold of the press mold. A mold 14.5 inches by 14.5 inches was utilized, and the jack 72 was actuated to place a pressure of 120 to 130 pounds per square inch on the plunger 66, thereby compressing the slurry to a thickness of approximately 2.5 inches measured from the felt pad 52 to the plunger 66. About 20% of the T-64 granular alumina was lost from the slurry through the felt pad 52 and around the edges of the plunger 66, the remaining 80% remaining in the molded fiber mat.

The molded fiber mat was thereafter removed from the mold 40 and permitted to air dry for a period of 2 days. The mat was thereafter placed in an oven and heated to a temperature of 1500° C. for a period of 2 hours. The resulting thermal insulating pad or block was found suitable for use in service applications up to a temperature of approximately 1500° C. The thermal insulating block was found to have a density of 27 pounds per cubic foot.

The inventors have found that products produced with the process described above using alumina-silica fibers having $Al_2O_3$ contents between 40% and 65% of the total fiber content by weight and $SiO_2$ content between 60% and 35% of the total fiber content by weight produce mullite ceramic products which are capable of service up to 1500° C. This is the same maximum service temperature that can be achieved in a fiber ceramic product with 50% of the fibers containing approximately 95% $Al_2O_3$ and 5% $SiO_2$ by weight and 50% of the fibers containing approximately 47% $Al_2O_3$ and 53% $SiO_2$ by weight, and the inventors have found that there is no applicable difference in the durability of refractory ceramic products made of the two types of fibers. The present cost of the ceramic raw materials used in the processes of the present invention however are only about 10% of the cost of the 95% $Al_2O_3$ and 5% $SiO_2$ ceramic fibers of the prior art process. Further, ceramic products manufactured by the present process have somewhat higher densities and have exhibited superior rigidity.

Those skilled in the art will devise many uses and applications for the present invention in addition to those herein disclosed. It is therefore intended that the scope of the present invention be not limited by the foregoing disclosure, but rather only by the appended claims.

The invention claimed is:

1. The method of making refractory ceramic products comprising the steps of combining a mass of ceramic materials and a body of liquid to form a slurry, the volume of the liquid being sufficient to permit the mixture to flow under vibration but insufficient to permit the mixture to flow without vibration, the mass of ceramic materials consisting essentially of amorphous fibers and powdered alumina, the fibers containing at least 90% $Al_2O_3$ and $SiO_2$ by weight, the fibers having a molecular ratio of $Al_2O_3$ to $SiO_2$ substantially less than 3 to 2, and the powdered alumina containing $Al_2O_3$, the molecular ratio of $Al_2O_3$ to $SiO_2$ in the combined ceramic fibers and powered alumina being at least 3 to 2, thereafter mixing the slurry to obtain a substantially uniform distribution of fibers and powdered alumina throughout the body of liquid, thereafter placing the slurry in a liquid absorbing mold and vibrating the slurry until it fills the mold, thereafter subjecting the mold to the slurry for a period of time to permit the mold to absorb a first substantial portion of the liquid of the slurry to produce a body within the mold containing a substantially uniform distribution of fibers and powdered alumina and the remaining liquid of the mixture, thereafter removing the body and the remaining liquid from the mold and heating the body to evaporate a second portion of the liquid therefrom, thereafter heating the body to a temperature between 950° C. and 1500° C., whereby the fibers become interconnected with each other and recrystallize combining silica and alumina from the fibers and powdered alumina to form mullite.

2. The method of making refractory ceramic products comprising the steps of claim 1 wherein the liquid consists essentially of water.

3. The method of making a refractory ceramic product comprising the steps of claim 2 wherein the alumina-silica fibers are chopped to a mean length no greater than ¼ inch.

4. The method of making a refractory ceramic product comprising the steps of claim 2 including the step of admixing a dispersing agent with the body of water before mixing the slurry.

5. The method of making a refractory ceramic product comprising the steps of claim 2 including the step of admixing an alginate with the body of water before mixing the slurry.

6. The method of making refractory ceramic products comprising the steps of claim 2 wherein the mold has a wall with a porosity no grater than a ¼ inch layer of felt and the step of removing a substantial portion of the water from the slurry pressurizes the slurry to force a portion of the water through the porous wall.

7. The method of making a refractory ceramic product comprising the steps of claim 6 wherein the slurry is subjected to a pressure of between 100 and 130 pounds per square inch.

* * * * *